Yasuo Segawa
Hiroaki Konaaku
INVENTORS

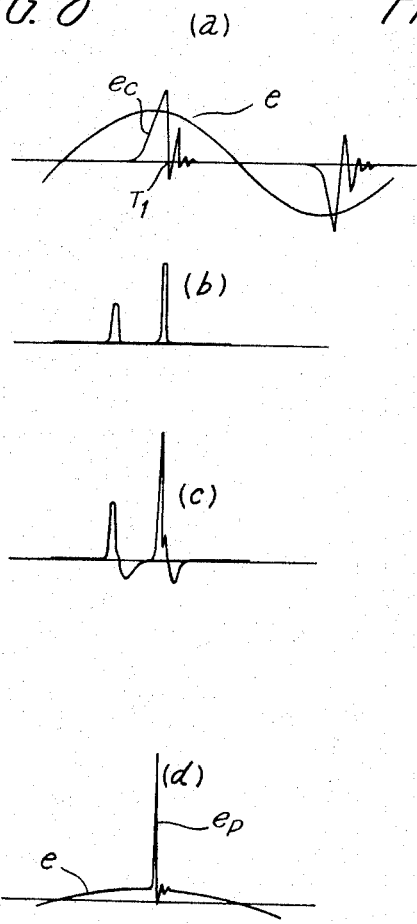
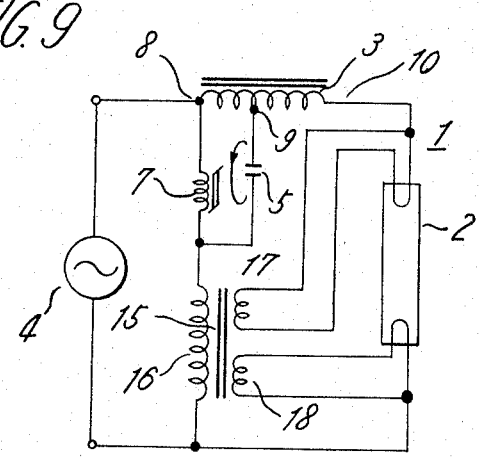
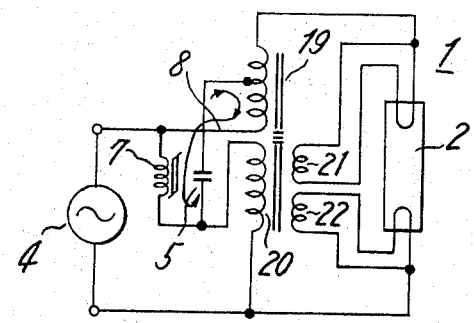
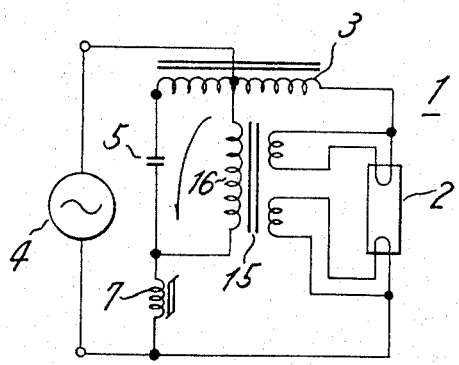

BY George B. Aujack
Attorney

United States Patent Office 3,364,386
Patented Jan. 16, 1968

3,364,386
PULSE GENERATING MEANS FOR STARTING DISCHARGE LAMPS
Yasuo Segawa, Tokyo, and Hiroaki Kousaka, Kawasaki-shi, Japan, assignor to Tokyo Shibaura Electric Co., Ltd., Kawasaki-shi, Japan, a corporation of Japan
Filed Nov. 9, 1964, Ser. No. 409,850
6 Claims. (Cl. 315—103)

This invention relates to a starting apparatus for discharge lamps, and more particularly to one which generates a pulsating or pulse voltage at every half cycle of a source voltage and superimposes the pulsating voltage upon the source voltage. This in turn will impress the superimposed voltage on discharge lamps in order that the discharge lamps can be started and lighted, easily and surely.

As well known in the art, there are proposed two systems for starting discharge lamps; i.e., one which is a cold-cathode starting system where discharge lamps start in a cold-cathode state by inmpressing a considerably high voltage, and another one is a hot-cathode starting system where discharge lamps start by preheating the filament electrodes. The latter starting system is further classified into two types; i.e. a switch-starting system wherein a filament-preheating current flows for a certain period of time through a glow starter, a thermal starter or a manual starter and the preheating circuit is opened after starting, a rapid starting system wherein a filament-heating coil is provided for a magnetic leakage transformer, or the like, which serves as a filament-preheating transformer. Both of these starting apparatus for discharge lamps as set forth in the above not only require a considerably high starting voltage or a sufficiently elevated preheat for a filament in order to start discharge lamps rapidly and steadily, but also, in a case of the rapid starting type even require a starting-aid to a discharge lamp in order to encourage starting.

Necessarily, a large capacity and size of a stabilizer (viz., a magnetic leakage transformer or a choke coil) serving as a current-controlling element is required to meet the requirements set forth above. Accordingly, a rise in cost is incurred and further a special consideration must be given to luminare equipment in providing a starting-aid. Moreover, sometimes conventional discharge lamps have an accident and starting of a discharge lamp can not be effected enough to be rapid and sure.

An object of this invention is to provide a starting apparatus for discharge lamps which can start and light easily and surely.

Another object of this invention is to provide a starting apparatus for discharge lamps which generate a pulsating voltage, particularly, at the time of starting, every half cycle of a source voltage and superimpose the pulsating voltage on the source voltage in order to impress the superimposed voltage on the discharge lamp in order that the discharge lamp can be started and lighted easily and steadily.

Another object of the present invention is to provide a starting apparatus for discharge lamps wherein a switch responsive to a certain instantaneous value during every half cycle of a source voltage controls discharge or charge of a capacitor to generate the above pulsating voltage at coil means is automatically decreased by means of flux produced by lamp current of said discharge lamp.

Another object of this invention is to provide a starting apparatus for a discharge lamp wherein a pulsating, i.e., pulse voltage, lagging in phase sufficiently and moreover being higher than a source voltage, is generated by charging a capacitor used to generate a pulse voltage via an inductance element.

These and other objects and features of the invention will become more apparent upon consideration of the following detailed description of an embodiment of the invention to be read in connection with the accompanying drawings in which:

FIG. 8 shows wave forms of voltages and currents in respective portions of the embodiments according to this invention;

FIGS. 9 to 14 inclusive shows, respectively, circuit diagrams of different embodiments according to this invention.

The main feature of this invention is to provide a starting apparatus for discharge lamps comprising a discharge circuit including a series section consisting of the discharge lamp and a stabilizing coil means, a switch element connected to an AC power source and responsive to a certain instantaneous value during each half cycle of the source voltage, and a capacitor controlled to discharge or charge by said switch element is generated at said coil means by said discharge or charge of said capacitor and superimposed on the source voltage to be impressed upon said discharge lamp.

Figure 1:
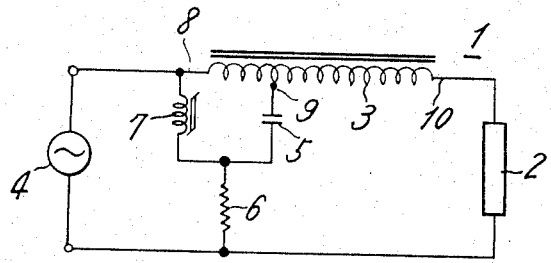
FIG. 1 shows a fundamental circuit diagram of a starting apparatus for a discharge lamp according to the present invention.

Referring now to the accompanying drawings, particularly to FIG. 1 showing a fundamental circuit diagram utilizing discharge of a capacitor according to this invention. The reference numeral 1 designates a discharge circuit comprising a coil means 3 connected in series to a discharge lamp 2 and also connected to an AC power source 4. 5 designates a capacitor whose one terminal is connected to one pole of the source voltage via a resistor 6 and further connected to one end 8 of the coil means 3 via a switch element 7 responsive to a certain instantaneous value during every half cycle of the source voltage and the other terminal connected to an intermediate tap 9 of said coil means 3. Consequently, said capacitor 5, in the above circuit, is charged by the power source voltage via said resistor 6 at the time when said switch element remains open.

Figure 2:
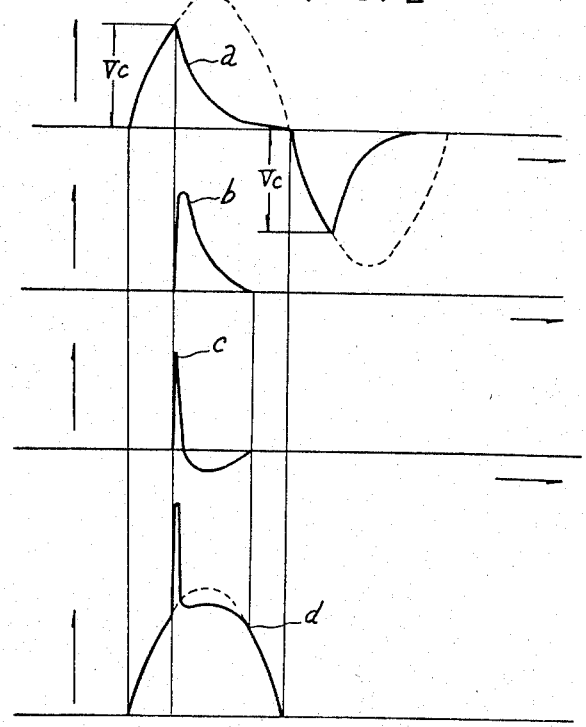
FIG. 2 shows wave forms of voltages and currents in respective portions of the circuit shown in FIG. 1.

When capacitor 5 is charged to a voltage of Vc, viz., when said switch element 7, at a time point of Vc, automatically closes in response to a certain instantaneous value of Vc, as seen from a curve shown in FIG. 2a, electric charge stored in said capacitor 5 will rapidly discharge through a closed circuit comprising said capacitor 5, an intermediate section between said intermediate tap 9 and one end 8 of said coil means 3 and said switch element 7 so that terminal voltages are rapidly decreased with a result that a discharge current flows through said switch element 7 as shown in FIG. 2b. For this reason, between intermediate tap 9 and one end 8 of said coil means 3 will be generated a pulsating voltage proportional to differential value of said current as shown in FIG. 2c. Seen from a standpoint of the above closed circuit, since said coil means acts an autotransformer, said pulse or pulsating voltage will be boosted up to either end of said coil means 3 in accordance with a turn ratio of $(n_1+n_2)/n_1$, where a number of turns of the intermediate section between said intermediate tap 9 and said one end 8 of said coil means 3 is assumed as $n_1$ and that of an intermediate section between said one end 8 and other end 10 of said coil means as $n_2$. On the other hand, since the source voltage (in practice, this voltage may be a secondary voltage) is impressed upon the discharge lamp 2, a voltage produced by superimposition of said pulsating voltage upon the source voltage and having a curve shown in FIG. 2d, is to be impressed upon said discharge lamp. There is no difference in the functional principle even if the position of switch element 7 and that of capacitor 5 are interchanged. In this case, a switching on and off operation of switch element 7 is to be repeated every half cycle of the source voltage. The function of the above-mentioned resistor 6 is to limit current flowing into switch 7 from the source 4 at the time when the switch element 7 is closed.

In the above description, it is evident from the experiments by the inventors that, since the pulsating or pulse voltage is superimposed upon the source voltage and the superimposed voltage is impressed upon the discharge lamp 2, said discharge lamp 2 usually will start during a first half cycle after closing of said switch element 7 and will light on with as many impressions as several tens of cycles of said pulsating voltage.

Further, said switch element 7 can be switched on and off two or more times during every half cycle of a source voltage if a responsive value of the voltage is suitably set. In this case, the pulsating voltage will be superimposed upon the source voltage as many times as corresponding to the number of the switching operation. Thereafter, as soon as the discharge lamp 2 starts and lights, discharge current will flow through said coil means 3 to produce flux, so that flux change in the iron core due to charging and discharging of said capacitor 5 in accordance with switching on and off of said switch element 7 is diminished. Consequently, since the pulsating voltage to be impressed upon the discharge lamp is made minute, there is no chance of bringing about bad influence upon a lighting state even if the switch should automatically close and open after lighting.

Figure 3:
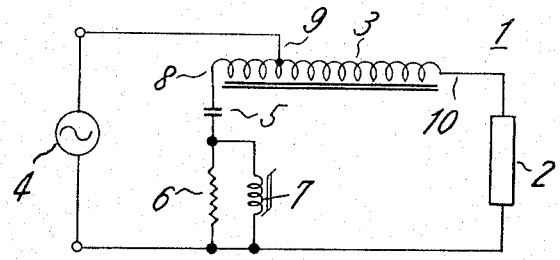
FIG. 3 shows another fundamental circuit diagram according to this invention.

FIG. 3 shows another fundamental circuit diagram utilizing the charge of a capacitor according to this invention, and the description of the same will be made hereunder, wherein the same parts as in FIG. 1 are designated with the same reference numerals. A discharge circuit is composed by connecting a coil means 3, in series, to a discharge lamp 2 and also connecting a power source 4 between an intermediate tap 9 of coil means 3 and discharge lamp 2, while a capacitor 5 is connected between one end 8 of said coil means 3 and one pole of said source 4 via a resistor 6 used as a current-limiting impedance element and a switch element 7 responsive to a certain instantaneous value during every half cycle of said power source 4 is connected in parallel with said resistor 6.

Figure 4:
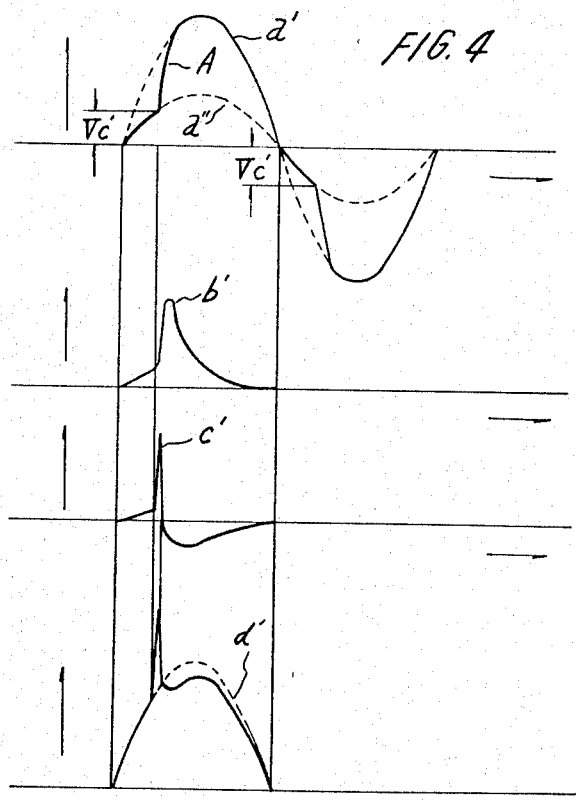
FIG. 4 shows wave forms in respective portions of the circuit shown in FIG. 3.

In the above arrangement, if switch element 7 is left open during a half cycle of said power source, capacitor 5 displays a terminal voltage shown with a curve $e_2$ in FIG. 4a, with respect to the source voltage. Since switch element 7 is closed at an instantaneous value of Vc' during a half cycle of source voltage, said resistor 6 will be short-circuited. Accordingly the instantaneous value of said source voltage being in phase is impressed on said capacitor 5 through an intermediate section between said intermediate tap 9 and the one end 10 of said coil means 3, so that said capacitor 5 will be rapidly charged as shown with a part A of a curve $e_1$ in FIG. 4a and a large charge current will, momentarily, flow as shown in FIG. 4b. As soon as said charge current flows through said intermediate section of said coil means 3, a pulsating voltage will be produced between said intermediate section as shown FIG. 4c. Consequently, said pulsating voltage will be boosted up across said intermediate section between said intermediate tap 9 and other end 8 in accordance with turn ratios of $(n_1+n_2)/n_1$, where the number of turns of a section between one end 8 and an intermediate tap 9 of said coil means 3 is assumed as $n_1$ and that of the section between said intermediate tap 9 and the other end 10 of said coil means 3 is assumed as $n_2$. Accordingly, also in this fundamental circuit, the pulsating voltage is superimposed upon the source voltage to impress the superimposed voltage, as shown in FIG. 4d, upon the discharge lamp 2 and hence a rapid start of the discharge lamp will be attained, as in the case of the fundamental circuit shown in FIG. 1. There is no change in this functional principle even if an inserting position of the switch element 7 and that of the capacitor 5 shown in FIG. 3 are interchanged each other. Said switch element 7 is operated in the same manner as in FIG. 1. Further, the pulsating voltage impressed upon the discharge lamp 2 after lighting is made minute, so that said pulsating voltage exerts no bad influence upon said discharge lamp 2.

Turning now to the switch element responsive to a certain instantaneous value during each half cycle in this invention, for example, a semiconductor controlling and rectifying element or a non-contact switch comprising a coil means having a magnet core displaying square hysteresis characteristics may be employed.

In the first place only throw-in of the power source may be enough to start a discharge lamp of this invention. Since thereafter the switch element 7 opens and closes for a required period of time in response to a certain instantaneous value during each half cycle of the source voltage, concurrently with throw-in of the power source, the required pulsating voltage starts to be generated automatically every half cycle of said source voltage and hence said discharge lamp will rapidly start, thus facilitating the operation.

In the present invention, the power source may be connected to the discharge lamp either electrically or electromagnetically. In the case of electromagnetic connection, a source voltage means a secondary voltage produced at a coil means which couples power source and discharge circuit. As a coil means 3, for example, a choke coil, a leakage autotransformer, a separated leakage transformer or the like can be used and, as a discharge lamp 2, either of a hot-cathode discharge lamp and a hot-cathode discharge lamp starting in a cold cathode state can be applicable to this invention.

Figure 5:
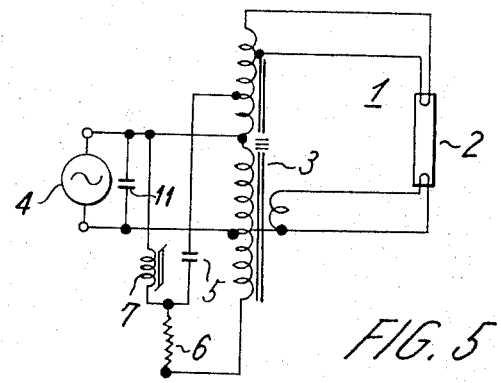
FIGS. 5 and 6 show circuit diagrams to illustrate practical embodiments according to this invention.

Further, this invention can be combined with conventional discharge lamps. Namely, FIG. 5 shows the case that the present invention is applied to a starting apparatus for a discharge lamp of a rapid starter system utilizing a leakage autotransformer, wherein said leakage autotransformer composing a coil means 3 has a coil for heating filaments of a discharge lamp 2. The reference numeral 11 designates a capacitor for power-factor improvement. The discharge circuit for the capacitor 5 is a closed circuit consisting of the switch element 7 and a part of the secondary winding of the leakage transformer coil means 3. When the switch element 7 is made conductive the discharge current of the capacitor 5 generates a high pulse voltage in the secondary winding of the coil means 3, which induced pulse voltage and a supply source voltage are superimposed to be impressed upon the lamp 2. The filament heating coil previously heats the filaments of the lamp 2 when source voltage is supplied. Thus, the discharge lamp 2 may be rapidly started. In FIG. 5 the lower coiled portion of winding 3 is placed as shown in order to improve the power factor and allow a small capacitor to be used.

Figure 6:
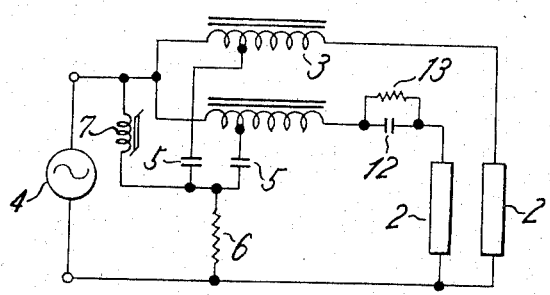

FIG. 6 shows a circuit diagram of the case that the present invention is applied to a starting apparatus for dual discharge lamps so-called flicker-less lamps circuit, wherein reference numerals 12 and 13 designate, respectively, a phase advancing capacitor and a discharge resistor for said capacitor. The circuit arrangements of FIGS. 5 and 6 operate in essentially the same manner as FIG. 1.

Figure 7:
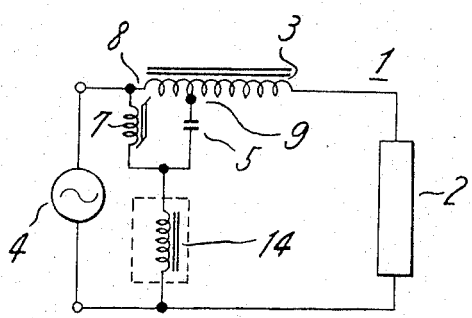
FIG. 7 shows a circuit diagram of an embodiment utilizing an inductance element as a current-limiting element of a pulsating voltage-generating circuit.

All embodiments described in the above show the cases that the resistor 6 is used as a current-limiting impedance element of the pulsating voltage-generating circuits. However, an inductance element 14 may be employed instead of said resistor 6, as shown in FIG. 7. FIG. 7 shows an embodiment modified from one shown in FIG. 1, and needless to say, a like modification can be applicable to those shown in FIGS. 3, 5 and 6.

A cold cathode discharge lamp, a high output hot cathode discharge lamp, an extra high output discharge lamp, or a high-pressure mercury-arc lamp requires large starting voltage, particularly, such inclination is remarkable in a discharge circuit having a plurality of discharge lamps connected in parallel.

FIG. 1 is now further explained in relation to the waveforms of FIG. 8. Namely, when a switch element 7 is left open in the above circuit, a capacitor 5 repeats charge and discharge by a source voltage through an inductance element 14. However, the moment said switch element 7 is closed at a time point of $T_1$ as shown with a curve $e_c$ in FIG. 8a, charge in said capacitor 5 will rapidly discharge through said capacitor 5, an intermediate section between an intermediate tap 9 and one end 8 of a coil means 3 viz., a portion of said coil means 3, said switch element 7 and said capacitor 5, so that the terminal voltage will rapidly decrease and a discharge current will flow as shown in FIG. 8b, accompanied with some damped oscillation. Accordingly, a pulsating voltage proportional to a differential value of the above current as shown in FIG. 8c will be generated across a section of said coil means 3, viz., between the intermediate tap 9 and the end 8 and boosted up, by a multiple of $(n_1+n_2)n_1$, by a boosting action of said coil means 3, thus generating a pulsating voltage e.p. On the other hand, since the source voltage $e$ is impressed upon a discharge lamp 2, said discharge lamp 2 is to be impressed with a superimposed voltage of said pulsating voltage and of the source voltage $e$ as shown in FIG. 8d. Of course, there is no change in this function even if an inserting position of said switch 7 and that of said capacitor 5 are interchanged each other, and further it will still be more effective if the characteristics of said switch element 7 are selected to open and close many times during a half cycle, because, a plurality of pulsating voltages can be superimposed.

Since the embodiment of FIG. 7 utilizes an inductance element 14 as a current-limiting impedance element inserted in a charge circuit of a capacitor 5, the voltage distribution in the capacitor 5 and the inductance element 14 at the time of charging differs from one in the case of using a capacitor and a resistance element, so that the value of the terminal voltage of the capacitor 5 can be made higher than that of the source voltage of the circuits previously shown. Accordingly, charge and discharge are rapidly effected as compared with the case where a resistor is employed as a current-limiting element with a result that a large pulsating voltage of the order of three times of one shown in FIG. 1 can be obtained. Further, a phase relation in a charging path of the capacitor 5 is changed due to interposition of the inductance element 14 and thereby a charging current of said condenser 5 lags considerably. If a saturable reactor having a square hysteresis characteristic is used as the switching element 14, it is easily attained to cause the phase of the pulsating voltage to lag behind the source voltage by approximately 90° to 140°, so that a pulsating voltage can be superimposed upon source voltage at the time when amplitude of the source voltage is large. For this reason, conjointly with that said pulsating voltage can be made large, a discharge lamp requiring a large starting voltage can be also started rapidly and steadily. Further, as phase in a pulsating voltage can be made to lag, if the circuit of this embodiment is applied to a dimmer for a discharge lamp of phase controlling type, there is brought about considerably favourable starting and lighting even in the case of requiring considerable illumination control.

As seen from the above, since a high pulsating voltage can be superimposed, as compared with the conventional one, a discharge lamp can not only start and light easily and steadily but also act to effect always a suitable lighting by automatic control of a pulsating voltage-superimposing action and thereby a comparatively low tension of a source voltage, viz., a voltage impressed on a discharge lamp, is good enough, with a result that not only a coil means can be made comparatively small-sized and low-costed but also the power loss at the time of starting can be made small. As a coil means, for example, a choke coil, a leakage transformer, a separated leakage transformer, or the like may be used.

The embodiment in FIG. 7 has been described with respect to the case where an independent inductance element has been used as a current-limiting element. However, alternatively, a pulsating voltage-generating circuit may be composed by utilizing a stabilizer or a filament-heating or the like, instead of the inductance element. FIGS. 9 to 14 inclusive show embodiments in such case.

FIG. 9 shows an embodiment utilizing a filament-heating transformer 15 as an inductance element, wherein a primary winding 16 of said transformer 15 is inserted between one end of a switch element 7 and one pole of a power source 4, and secondary winding 17 and 18 of said transformer 15 are, respectively, connected to a pair of filaments of a discharge lamp 2. As the rest is the same as the case shown in FIG. 7, the description thereof will be omitted with only designating the same parts with the same reference numerals as in FIG. 7. In this embodiment, as a filament-heating transformer is utilized as a current-limiting element at the same time, there is provided a starting apparatus which is economical and simple in construction.

FIG. 10 shows another embodiment based upon the same principle as one in FIG. 9, wherein a magnet means 3 and the filament-heating transformer 15 are provided. This embodiment provides filament-heating windings 21 and 22 on the side of a primary winding 20 of the magnetic leakage transformer 19 and composes a pulse-generating circuit by utilizing portions of the primary winding 20 and the secondary winding 23. While the filament-heating windings 21 and 22 are provided for the magnetic leakage transformer 19, alternatively, a filament-heating transformer may be used separately.

FIG. 11 shows an embodiment wherein one terminal of a power source 4 and one end of a primary winding 16 of filament-heating transformer 15 are, respectively, connected to an intermediate tap of a coil means 3 similar to a choke coil, and a capacitor 5 is inserted between one end of said coil means 3 and the other end of said primary winding of said transformer 15. In the above circuit composition, a switch element 7, which remains always closed, is connected between the junction point and the other end of the power source 4, thus forming a pulsating voltage-generating circuit. When said switch element 7 which is opened for a short period of time charge in said capacitor 7 will be rapidly discharged through a section of said coil means 3 and a closed path of the primary winding 16, thereby generating a pulsating voltage at a portion of said coil means 3. Thereafter this pulsating voltage is superimposed upon the source voltage to impress upon a discharge lamp 2 as in the above embodiments. In the above case, feed to the filament-heating transformer 15 is intercepted temporarily due to opening of the switch element 7 for a short period of time. However, there is no bad influence upon a preheating action owing to existence of heat inertia.

Figure 12:
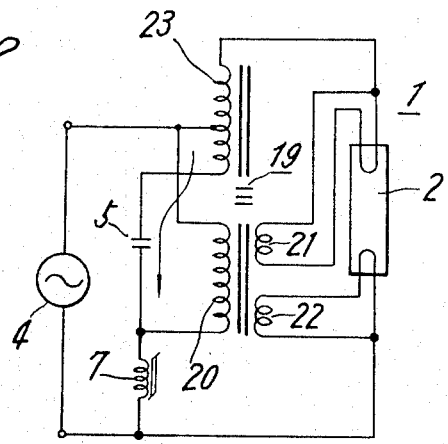

FIG. 12 shows an embodiment modified from one shown in FIG. 11, wherein a magnetic leakage transformer 19 is used, instead of a filament-heating transformer 15. Namely, a primary winding 20 of said transformer 19 is connected to both ends of a capacitor 5 via a section of a secondary winding 23 of said transformer 19. Alternatively, filament-heating windings 21 and 22 may be provided for a filament-heating transformer, instead of provided for the magnetic leakage transformer 19.

Figure 13:
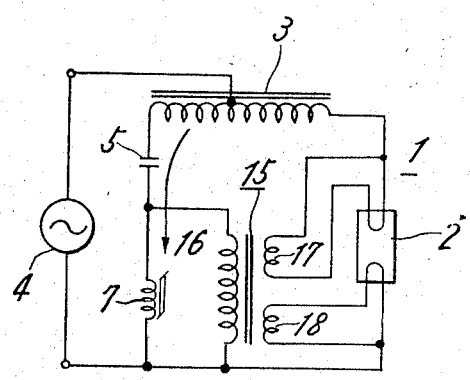
Figure 14:
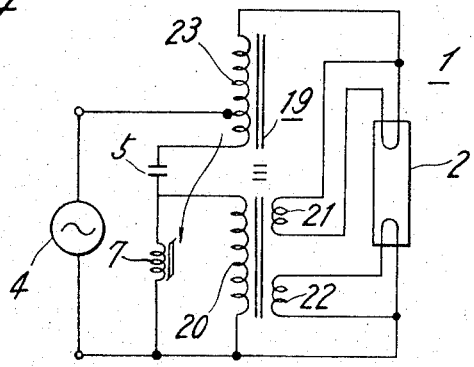

FIGS. 13 and 14 show other embodiments wherein a primary winding 16 of a filament-heating transformer 15 or a primary winding 20 of a magnetic leakage transformer is connected in parallel to a switch element 7 whose one end is connected to one end of a power source 4 and the other end to end of a capacitor 7 and the other end of said capacitor 7 is connected to the other end of said power source via a portion of coil means 3. That is to say, a filament-heating transformer is used in FIG. 13 and a magnetic leakage transformer in FIG. 14, respectively. In these embodiments, when said switch element is opened for a short period of time during a half cycle of a source voltage, charging current flows rapidly in a capacitor 5 and generates a high pulsating voltage at a coil means 3 to impress upon a discharge lamp as above. Throughout all the above embodiments, the same parts are designated by the same reference numerals to facilitate the description and understanding.

Further, the present invention is applicable to a plurality of starting circuits for a plurality of discharge lamps which can light a plurality of discharge lamps at the same time by means of a single switch, by connecting in series a plurality of starting circuits for respective discharge lamps.

As understood from the above description, it will be obvious to those skilled in the art that as the present invention charges or discharges a capacitor every half cycle of a source voltage to generate a high pulsating voltage at a coil means and superimposes said high pulsating voltage upon said source voltage, there is provided a starting apparatus for a discharge lamp which has a comparatively simple structure and can carry out a rapid and sure starting and lighting.

What is claimed is:

1. In a starting apparatus for a discharge lamp having a discharge circuit connected across supply terminals for connection to an AC power source, said discharge circuit including a stabilizing coil means with one end lead thereof connected to one of said supply terminals and a discharge lamp connected between the other end lead of said stabilizing coil means and the other supply terminal, the improvement comprising a pulse voltage generating circuit having a saturable reactor switch element automatically responsive to a predetermined instantaneous value during every half cycle of a source voltage with one end thereof connected to said one of said supply terminals, said saturable reactor switch element effecting a switching action automatically at a certain voltage-time integral during every half cycle of source voltage, a capacitor with one end thereof connected to a tap defining a control section between the tap and said one end lead of said stabilizing coil means and the other end thereof connected to the other end of said saturable reactor switch element at a junction point, and a current-limiting impedance element connected between said junction point and said other supply terminal, wherein by operation of said switch element during a half cycle of said source voltage, discharge of said capacitor is controlled so as to generate a pulse voltage across the control section of said stabilizing coil means and said pulse voltage is superimposed on said source voltage to be applied to said discharge lamp.

2. A circuit arrangement according to claim 1 comprising a second discharge circuit including a second stabilizing coil means with one end lead thereof connected to one of said supply terminals and a second discharge lamp connected between the other end lead of said second stabilizing coil means and the other supply terminal, and a second capacitor with one end thereof connected to a tap defining a control section between the tap and said one end lead of said second stabilizing coil means and the other end thereof connected to said junction point.

3. A circuit according to claim 1 wherein the stabilizing coil means is a first winding means of a leakage transformer having a second coil means inductively linked with said first winding means and connected across said supply terminals.

4. A circuit according to claim 2 wherein a resistor and a capacitor are connected in parallel between the second lamp and said other end lead of said second stabilizing coil means.

5. A circuit according to claim 3 wherein a third winding means inductively linked with said second winding means is connected between said other supply terminal and the other terminal of said current-limiting impedance element and a capacitor is connected between said one terminal of said supply terminals and said other terminal of said current-limiting impedance element.

6. A circuit according to claim 3 wherein a pair of windings for heating filament means of the lamp are provided, each one of said windings being inductively linked with said first and second winding means of said leakage transformer respectively.

References Cited

UNITED STATES PATENTS

| | | | |
|---|---|---|---|
| 2,334,567 | 11/1943 | Lord | 315—239 |
| 2,480,060 | 8/1949 | Van Looy et al. | 315—243 |
| 2,887,592 | 5/1959 | Stout et al. | 315—209 |
| 2,916,671 | 12/1959 | Retzer | 315—239 |
| 3,096,465 | 7/1963 | Moerkens. | |
| 3,235,770 | 2/1966 | Wattenbach | 315—239 |

DAVID J. GALVIN, *Primary Examiner.*